(12) United States Patent
Schroeder et al.

(10) Patent No.: US 8,594,628 B1
(45) Date of Patent: Nov. 26, 2013

(54) CREDENTIAL GENERATION FOR AUTOMATIC AUTHENTICATION ON WIRELESS ACCESS NETWORK

(75) Inventors: Hartmut Schroeder, Duisburg (DE); Hendrikus G. P. Bosch, Aalsmeer (NL); Prem Ananthakrishnan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/247,308

(22) Filed: Sep. 28, 2011

(51) Int. Cl.
*H04M 1/66* (2006.01)

(52) U.S. Cl.
USPC ........... 455/411; 455/410; 370/331; 370/352; 370/353; 370/354; 370/355; 370/356; 713/150; 713/170; 713/152; 379/142.05; 379/142.06; 379/118; 379/127.06

(58) Field of Classification Search
USPC ................ 455/435.2, 432.1, 432.2, 410, 411; 370/331, 332, 352, 353, 354, 355, 356; 379/142.05, 142.06, 118, 127.06; 713/155, 170
See application file for complete search history.

(56) References Cited

U.S. PATENT DOCUMENTS

| | | | |
|---|---|---|---|
| 2004/0122959 A1* | 6/2004 | Lortz | 709/229 |
| 2005/0074126 A1* | 4/2005 | Stanko | 380/279 |
| 2007/0197237 A1* | 8/2007 | Powell et al. | 455/466 |
| 2009/0028082 A1* | 1/2009 | Wynn et al. | 370/310 |
| 2009/0036128 A1* | 2/2009 | Raguparan et al. | 455/436 |
| 2011/0296504 A1* | 12/2011 | Burch et al. | 726/6 |

OTHER PUBLICATIONS

U.S. Appl. No. 12/967,977, by Vikki Yin Wei, filed Dec. 14, 2010.
U.S. Appl. No. 13/247,357, by Hartmut Schroeder, filed Sep. 28, 2011.

* cited by examiner

*Primary Examiner* — Khalid Shaheed
(74) *Attorney, Agent, or Firm* — Shumaker & Sieffert, P.A.

(57) ABSTRACT

Network devices provide seamless offloading of data communications from a service provider's cellular network to an alternate access network outside of the service provider's cellular network. After a cellular mobile device has initially been authenticated by devices in the cellular network to communicate with a packet data network via the cellular network, the cellular mobile device is configured to leverage its prior authentication on the cellular network and automatically obtain credentials for use in logging onto the alternate access network, without requiring any action by a user of the cellular mobile device. After the cellular mobile device is logged on to the alternate access network, the cellular mobile device sends wireless data communications to the packet data network via the alternate access network instead of the cellular network.

30 Claims, 8 Drawing Sheets

CREDENTIAL GENERATION FOR AUTOMATIC AUTHENTICATION ON WIRELESS ACCESS NETWORK

TECHNICAL FIELD

The disclosure relates to mobile networks and, more specifically, to wireless access networks.

BACKGROUND

Use of cellular mobile devices for accessing computer data networks has recently increased dramatically. These mobile devices, often referred to as "smart" phones, provide a platform for both cellular phone calls and cellular-based access to computer data services. For example, a typical cellular network is a collection of cells that each include base stations capable of transmitting and relaying radio signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices may transmit radio signals at the designated frequency to the base stations to initiate cellular telephone calls or packet-based data services.

With respect to data services, cellular service providers convert the cellular signals, e.g., Time Division Multiple Access (TDMA) signals, Orthogonal Frequency-Division Multiplexing (OFDM) signals or Code Division Multiple Access (CDMA) signals, received from mobile devices at the base stations into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS), an evolution of UMTS referred to as Long Term Evolution (LTE), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

In this way, the cellular service provider provides data services and connectivity to the cellular mobile devices, allowing the cellular mobile devices to access various packet data networks (PDNs). The PDNs provide a variety of packet-based data services to the cellular mobile device and allow the wireless devices to exchange service data with application or other servers of the PDNs. PDNs may include, for example, the Internet, an enterprise intranet, a layer three (L3) VPN, and a service provider's private network. A service provider's cellular network transports subscriber traffic exchanged between the cellular mobile device and the PDN.

The ubiquitous use of cellular mobile devices and the ever increasing desire by users for fast network access from around the world has presented many challenges. For example, the use of cellular mobile devices have placed a high demand for data services over the service provider's cellular network, often straining the cellular network and resulting in delayed or lost data communications. Some cellular mobile devices, in addition to supporting connections to a PDN via a radio interface, also support wireless capabilities to exchange data via an alternate access network that is separate from the cellular network of the mobile service provider. For example, many cellular mobile devices include a wireless local area network (WLAN) interface that provides data service when in the presences of a WiFi "hotspot" or other wireless access point (WAP). Other examples of such wireless capabilities may include Bluetooth or Near Field Communication (NFC). When in the presence of a WLAN, a user may wish to transition the data services of the cellular mobile device to the WLAN so as to accelerate data transmissions and avoid any delays associated with the cellular network.

SUMMARY

This disclosure describes techniques for seamless offloading of data communications from a service provider's cellular network to an alternate access network outside of the service provider's cellular network. After a cellular mobile device has initially been authenticated by the cellular network and configured to receive data services from a packet data network via the cellular network, the cellular mobile device may travel into range of a wireless access point of the alternate access network. The cellular mobile device is configured to leverage its prior authentication on the cellular network and automatically obtain credentials for logging onto the alternate access network, without necessarily requiring any action by a user of the cellular mobile device. After the cellular mobile device has automatically established data services over the alternate access network, the cellular mobile device communicates with the packet data network via the alternate access network without service interruption.

For example, after the cellular mobile device has been authenticated over the service provider's cellular network, a WiFi offload manager executing on the cellular mobile device automatically sends information that identifies the cellular mobile device to a credential portal of the service provider network. For example, the WiFi offload manager collects and sends an identifier for the cellular mobile device (e.g., an IMSI from a SIM card within the device) and a layer two (L2) identifier for a wireless local area network (WLAN) interface of the device. The credential portal generates credentials, e.g., a username and password, based on the information provided by the cellular mobile device, and sends the credentials back to the cellular mobile device. The credential portal also stores the credentials and the original information from the device to a subscriber database that is also accessible by an authentication server for the alternate access network. In the event the cellular mobile device later transitions to the alternate access network using its WLAN interface (e.g., wireless access card) and attempts to log in to the alternate access network using the provided credentials, the authentication server matches the credentials provided by the cellular mobile device to those stored in the subscriber database, and allows the cellular mobile device to access a packet data network such as the Internet via the WiFi hotspot.

In one aspect, a method includes after a cellular mobile device is authenticated on a service provider cellular network, automatically sending by the cellular mobile device a communication to a credential portal positioned within a core network of the service provider, wherein the communication includes an identifier of the cellular mobile device obtained from hardware of the cellular mobile device and a layer two (L2) address associated with the cellular mobile device. The method further includes receiving, by the cellular mobile device, a communication from the credential portal, wherein the communication includes a username and password generated by the credential portal for use in authenticating the cellular mobile device on an alternate access network separate from the service provider cellular network, wherein the username and password are generated by the credential portal based on the identifier of the cellular mobile device and the L2 address associated with the cellular mobile device, and storing the username and password by the cellular mobile device. The method also includes disconnecting the cellular mobile device from the service provider cellular network, automatically providing, by the cellular mobile device, the username and password to a wireless access point of the alternate access network for authenticating the cellular mobile device on the alternate access network, and after the cellular mobile device is authenticated on the alternate access network, sending, by the cellular mobile device, data communications to a packet data network by the alternate access network instead of by the cellular network.

In another aspect, a cellular mobile device includes a transmitter and receiver to send and receive cellular communications in the form of radio frequency signals, a wireless access card to send and receive wireless communications that conform to an IEEE 802.1x standard, a microprocessor, and an operating system executing on the microprocessor to provide an operating environment of application software. The cellular mobile device also includes an offload manager application executing on the operating system, wherein, after the cellular mobile device is authenticated on a service provider cellular network, the offload manager application is configured to automatically send a communication to a credential portal positioned within a core network of the service provider, wherein the communication includes an identifier of the cellular mobile device obtained from hardware of the cellular mobile device and a layer two (L2) address of the wireless access card. The offload manager receives a communication from the credential portal, wherein the communication includes a username and password generated by the credential portal for use in authenticating the cellular mobile device on an alternate access network separate from the service provider cellular network, wherein the username and password are generated by the credential portal based on the identifier of the cellular mobile device and the L2 address associated with the cellular mobile device. The offload manager stores the username and password, and disconnects the cellular mobile device from the service provider cellular network in response to receiving the communication from the credential portal and sensing a signal from a wireless access point of the alternate access network, and automatically authenticates the cellular mobile device on the alternate access network by providing the username and password to the wireless access point.

In another aspect, a non-transitory computer-readable storage medium comprising instructions for causing a programmable processor of a cellular mobile device to, after the cellular mobile device is authenticated on a service provider cellular network, automatically send a communication to a credential portal positioned within a core network of the service provider, wherein the communication includes an identifier of the cellular mobile device obtained from hardware of the cellular mobile device and a layer two (L2) address associated with the cellular mobile device. The instructions also include instructions to receive a communication from the credential portal, wherein the communication includes a username and password generated by the credential portal for use in authenticating the cellular mobile device on an alternate access network separate from the service provider cellular network, wherein the username and password are generated by the credential portal based on the identifier of the cellular mobile device and the L2 address associated with the cellular mobile device, and storing the username and password. The instructions also include instructions to disconnect the cellular mobile device from the service provider cellular network, automatically provide the username and password to a wireless access point of the alternate access network for authenticating the cellular mobile device on the alternate access network, and, after the cellular mobile device is authenticated on the alternate access network, send data communications to a packet data network by the alternate access network instead of by the cellular network.

In a further aspect, a system includes a packet data network, a service provider network that includes a core network comprising a credential portal, an Authentication, Authorization, and Accounting (AAA) server, and a subscriber database accessible by the credential portal and the AAA server. The service provider network also includes a cellular network for accessing the core network and the packet data network. The system includes a cellular mobile device comprising a microprocessor, an operating system executing on the microprocessor to provide an operating environment of application software, a wireless access card to send and receive wireless communications that conform to an IEEE 802.1x standard, and an offload manager application executing on the operating system. After the cellular mobile device is authenticated on a service provider cellular network, the offload manager application is configured to automatically send a communication to the credential portal, wherein the communication includes an identifier of the cellular mobile device obtained from hardware of the cellular mobile device and a layer two (L2) address of the wireless access card. Upon receiving the communication, the credential portal generates a username and password based on the identifier of the cellular mobile device and the L2 address associated with the cellular mobile device, and sends the username and password to the cellular mobile device for use in authenticating the cellular mobile device on the alternate access network. Upon receiving the username and password from the credential portal, the offload manager stores the username and password, and later disconnects the cellular mobile device from the service provider cellular network, and automatically authenticates the cellular mobile device on the alternate access network by providing the username and password to the wireless access point.

In a further aspect, a credential portal includes a physical interface that receives a communication from a cellular mobile device, wherein the communication includes an identifier of the cellular mobile device obtained from hardware of the cellular mobile device and a layer two (L2) address associated with the cellular mobile device, wherein the cellular mobile device is previously authenticated on a cellular network of a service provider, and a credential generator that generates a username and password based on the identifier of the cellular mobile device and the address associated with the cellular mobile device. The credential portal stores the received identifier of the cellular mobile device and the address associated with the cellular mobile device and the generated username and password to a subscriber database accessible by an Authentication, Authorization, and Accounting (AAA) server that is used by a wireless access point of an alternate access network separate from the service provider cellular network. The credential portal forms a message that includes the username and password, and sends the message to the cellular mobile device for use in authenticating the cellular mobile device on the alternate access network.

In a further aspect, a method includes receiving, by a credential portal, a communication from a cellular mobile device, wherein the communication includes an identifier of the cellular mobile device obtained from hardware of the cellular mobile device and a layer two (L2) address associated with the cellular mobile device, wherein the cellular mobile device is previously authenticated on a cellular network of a service provider, generating, by the credential portal, a username and password based on the identifier of the cellular mobile device and the address associated with the cellular mobile device, and storing, by the credential portal, the received identifier of the cellular mobile device and the address associated with the cellular mobile device and the generated username and password to a subscriber database accessible by an Authentication, Authorization, and Accounting (AAA) server that is used by a wireless access point of an alternate access network separate from the service provider cellular network. The method also includes forming a message that includes the username and password, and sending the message to the cellular mobile device for use in authenticating the cellular mobile device on the alternate access network.

The techniques of this disclosure may provide one or more advantages. For example, the techniques described herein provide a seamless mechanism that allows the cellular mobile device to automatically obtain credentials (e.g., a username and password) to be used for authenticating on an alternate access network, such as a WiFi hotspot. The mechanism leverages the fact that the cellular mobile device was previously authenticated through the mobile wireless network. The techniques may be used on a wide variety of brands and platforms of cellular mobile device, and do not require the cellular mobile device to log onto the alternate access network using SIM-based authentication such as EAP-SIM or EAP-AKA. In other words, authentication of the cellular mobile device on an alternate access network by a AAA server of the service provider can proceed as usual according to 802.1x or Captive Portal Pages, without requiring access by the AAA server to the SIM credentials of cellular mobile device.

The techniques of the disclosure may allow the service provider to offload data communications to an alternate wireless infrastructure, such as a WLAN, and thereby to accommodate larger volume of data traffic from cellular mobile devices without requiring as much investment in cellular network infrastructure. This may offer a cost savings for the service provider.

The techniques may be seamless in that they need not necessarily require user input to authenticate the cellular mobile device on the alternate access network. For example, the user does not have to input a username and password to switch to the WiFi hotspot. Instead, the WiFi offload manager executing on the cellular mobile device can automatically obtain the login credentials and provide them to the authentication server. Moreover, authenticating the cellular mobile device on the alternate access network occurs automatically and without disruption to services provided from the packet data network to the cellular mobile device.

The details of one or more examples are set forth in the accompanying drawings and the description below. Other features, objects, and advantages will be apparent from the description and drawings, and from the claims.

DETAILED DESCRIPTION

Figure 1A:
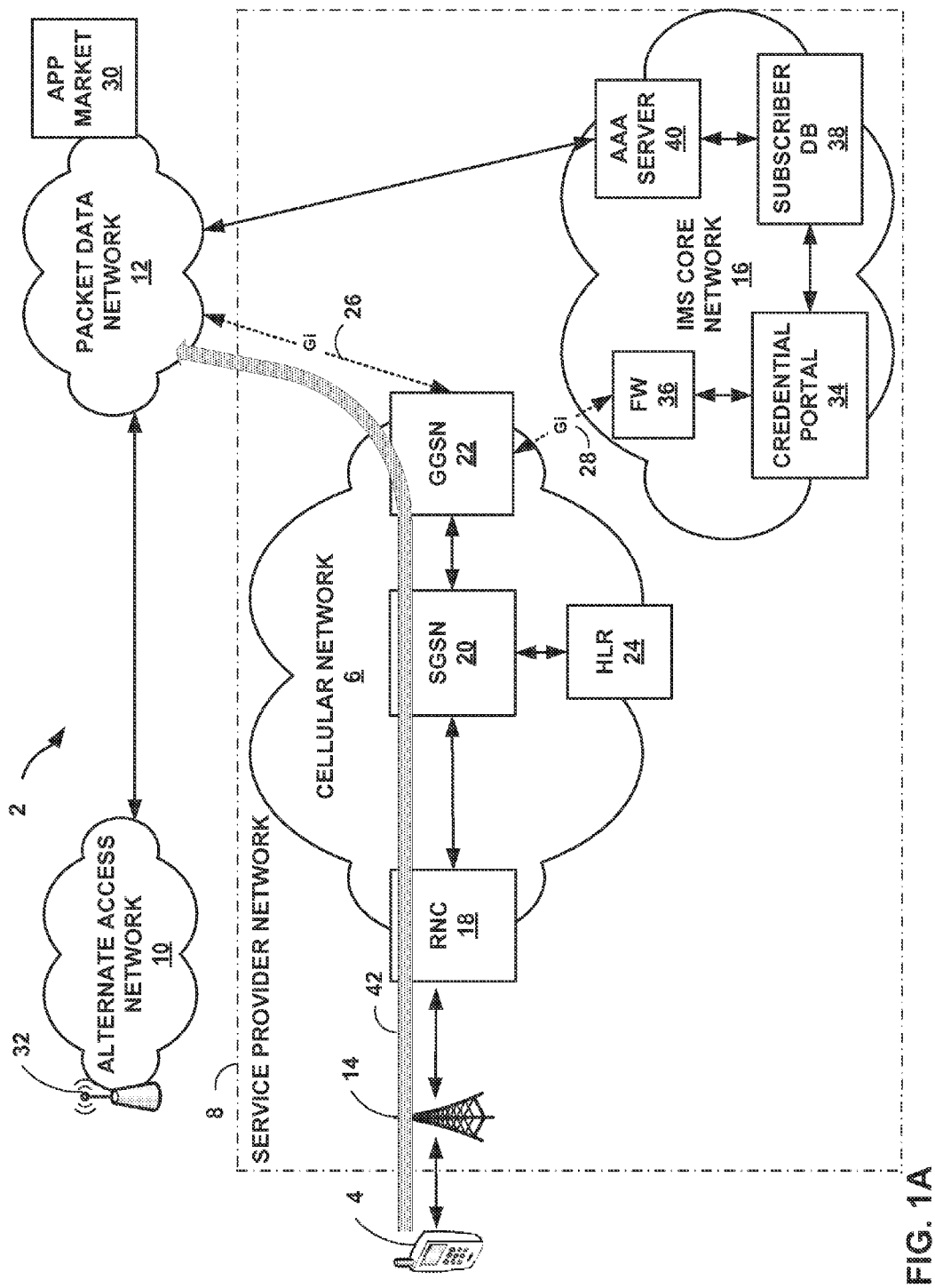
FIGS. 1A-1C are block diagrams illustrating example network systems that include network components operating according to the described techniques.

FIG. 1A is a block diagram illustrating an example network system 2 in which various network components operate in accordance with the described techniques. In the example of FIG. 1A, network system 2 includes network components that automatically provide seamless authentication of a cellular mobile device 4 while transitioning between cellular network 6 of a service provider (SP) network 8 and an alternate access network 10 outside of the SP network 8. Network system 2 includes an example SP network 8 having a cellular network 6 that allows data communications between a cellular mobile device 6 and a packet data network (PDN) 12, such as the Internet.

The techniques of this disclosure allow for offloading data communications from the service provider's cellular network 6 to alternate access network 10 outside of cellular network 6. After cellular mobile device 4 has initially been authenticated by devices in cellular network 6 to communicate with PDN 12 and IP Multimedia Subsystem (IMS) core network 16 via cellular network 6, cellular mobile device 4 may travel into range of an access point of alternate access network 10. As described in further detail below, the techniques of this disclosure allow cellular mobile device 4 to leverage its prior authentication on cellular network 6 and automatically obtain credentials for authenticating on alternate access network 10, without requiring any action by a user of cellular mobile device 4. After cellular mobile device 4 is logged on to alternate access network 10, cellular mobile device 4 can send wireless data communications to PDN 12 via alternate access network 10 instead of cellular network 6.

Cellular mobile device 4 represents any mobile communication device that supports both cellular radio access and local wireless (so called, "WiFi") network access, e.g., by way of a wireless LAN interface using any of the 802.11 communication protocols. Cellular mobile device 4 may comprise, for example, a mobile telephone, a laptop or other mobile computer having, e.g., a 3G/4G wireless card, a smart phone, or a personal data assistant (PDA) having both cellular and WLAN communication capabilities. Cellular mobile device 4 may run one or more software applications, such as VoIP clients, video games, videoconferencing, E-mail, and Internet browsers, among others. PDN 12 supports one or more packet-based services that are available for request and use by cellular mobile device 4. Certain applications running on cellular mobile device 4 may require access to services offered by PDN 12, such as mobile calls, video games, videoconferencing, and email, among others. Cellular mobile device 4 may also be referred to, in various architectural embodiments, as User Equipment (UE) or mobile station (MS). One example of a cellular mobile device is described in U.S. patent application Ser. No. 12/967,977 filed Dec. 14, 2010, entitled "MULTI-SERVICE VPN NETWORK CLIENT FOR CELLULAR MOBILE DEVICE," incorporated herein by reference. Cellular mobile device 4 stores a unique identifier such as, for example, an International Mobile Subscriber Identity (IMSI), or an International Mobile Equipment Identity (IMEI) stored, for instance, in a subscriber identity module (SIM) or in a memory or integrated circuit of cellular mobile device 4.

A service provider operates SP network 8 to provide network access, data transport and other services to cellular mobile device 4. SP network 8 comprises base station 14, cellular network 6, and IMS core network 16. Cellular mobile device 4 communicates with base station 14 over wireless links to access SP network 8.

The service provider provisions and operates cellular network 6 to provide network access, data transport and other services to cellular mobile device 4. In general, cellular network 6 may implement any commonly defined cellular network architecture including those defined by standards bodies, such as the Global System for Mobile communication (GSM) Association, the $3^{rd}$ Generation Partnership Project (3GPP), the $3^{rd}$ Generation Partnership Project 2 (3GPP/2), the Internet Engineering Task Force (IETF), and the Worldwide Interoperability for Microwave Access (WiMAX) forum. For example, cellular network 6 may represent one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Cellular network 6 may, alternatively or in conjunction with one of the above, implement a code division multiple access-2000 ("CDMA2000") architecture. Cellular network 6 may, again as an alternative or in conjunction with one or more of the above, implement a WiMAX architecture defined by the WiMAX forum.

In the example of FIG. 1A, SP network 8 comprises a Universal Mobile Telephony Service (UMTS) network that operates in accordance with the 3rd Generation Partnership Project (3GPP) standards and with the techniques described herein. For purposes of illustration, the techniques herein will be described with respect to a UMTS network. However, the techniques are applicable to other communication network types in other examples. For instance, the techniques are similarly applicable to network architectures and nodes deploying 3GPP/2, CDMA2000, WiMAX, and Mobile IP based technologies and standards.

In this example, cellular network 6 includes radio network controller (RNC) 18 coupled to base station 14. RNC 18 and base station 14 provide wireless access by cellular mobile device 4 to cellular network 6. Base station 14 may be a Node B base transceiver station that uses an air interface to communicate with user equipment in the geographic region (or "cell") that base station 14 serves. In some examples, base station 14 is a femtocell. Cellular mobile device 4 is located within the cell served by base station 14. SP network 8 may, in some instances, include additional base stations, each of which may serve one of several cells. In some examples, base station 14 may be another type of wireless transceiver station, such as a site controller or a WiMAX access point. User equipment, such as cellular mobile device 4, may be referred to in alternative architectures as a mobile station (MS).

In the illustrated embodiment, cellular network 6 includes serving GPRS support node 20 ("SGSN 20"), and gateway GPRS support node 22 ("GGSN 22"). SGSN 20 switches mobile traffic to available GGSNs, such as GGSN 22. Cellular network 6 also includes RNC 18, which manages and routes data to/from base station 14 to SGSN 20. RNC 18 may establish and support GTP tunnels to SGSN 20. In some instances, RNC 18 comprises an IP router. In some embodiments, SP network 8 may include additional RNCs and associated base stations variously arranged.

SGSN 20 and GGSN 22 provide packet-switched (PS) services to RNC 18. For example, SGSN 20 and GGSN 22 provide packet routing and switching, as well as mobility management, authentication, and session management for cellular mobile device 4 served by RNC 18. The packet-switched services provided by SGSN 20 and GGSN 22 may include mobility services, such as authentication and roaming services, as well as call handling services, signaling, billing, and internetworking between cellular network 6 and external networks, such as PDN 12. For example, SGSN 20 serves RNC 18. Cellular mobile device 4 connects to SGSN 20, sending identifying credentials for the SIM card inside cellular mobile device 4 (e.g., an IMSI) to SGSN 20 via RNC 18, which SGSN 20 uses to authenticate the cellular mobile device in cooperation with Home Location Register (HLR) 24. In some examples, HLR 24 may be connected to AAA server 40.

GGSN 22 is a gateway node that connects cellular network 6 to PDN 14 via Gi interface 26 operating over a physical communication link (not shown). GGSN 22 also connects cellular network 6 to IMS core network 16 via Gi interface 28 operating over another physical communication link (not shown) or the same interface 26 as for PDN 14. SGSN 10 obtains data traffic from RNC 18, e.g., traffic from cellular mobile device 4, and routes the data traffic to GGSN 22. GGSN 22 decapsulates the data traffic, and initiates IP traffic on the Gi interfaces 26, 28. GGSN 22 enables access to one or more services provided by servers via PDN 14, and GGSN 22 maps accessible services to access points. In the example of FIG. 1A, one service includes an applications market ("APP market") 30 reachable via packet data network 12. Cellular mobile device 4 may download executable applications from application market 30, to be executed on an operating system of cellular mobile device 4.

In some situations, a subscriber associated with cellular mobile device 4 may wish to receive data services via alternate access network 10 instead cellular network 6 of SP network 8. Alternate access network 10 may be, for example, a WLAN network. In the example of FIG. 1A, alternate access network 10 includes WLAN access point 32, to which cellular mobile device 4 can attach in order to access the services available through PDN 12. The techniques of this disclosure allow for seamless authentication of cellular mobile device 4 on alternate access network 10 when the cellular mobile device transitions between cellular network 6 of SP network 8 and alternate access network 10 outside of the SP network 8. As discussed in further detail below, in some aspects, cellular mobile device 4 may download an application ("app") having a WiFi Offload Manager application that provides support for seamless offloading and authentication of cellular mobile device 4 onto alternate access network 10 when cellular mobile device 4 moves from cellular network 6 to alternate access network 10. Alternatively, cellular mobile device 4 may be preloaded with the WiFi Offload Manager by its manufacturer.

As shown in FIG. 1A, IMS core network 16 includes credential portal 34, which communicates with the WiFi Offload Manager application executing on cellular mobile device 4 to facilitate transition between cellular network 6 and alternate access network 10. Credential portal 34 may be, for example, a provisioning server or other device that maintains subscriber database 38 within IMS core network 16. Initially, cellular mobile device 4 is authenticated on cellular network 6 by SGSN 20 in cooperation with HLR 24 and connects to PDN 12 to exchange data communications 42 with PDN 12.

Figure 1B:
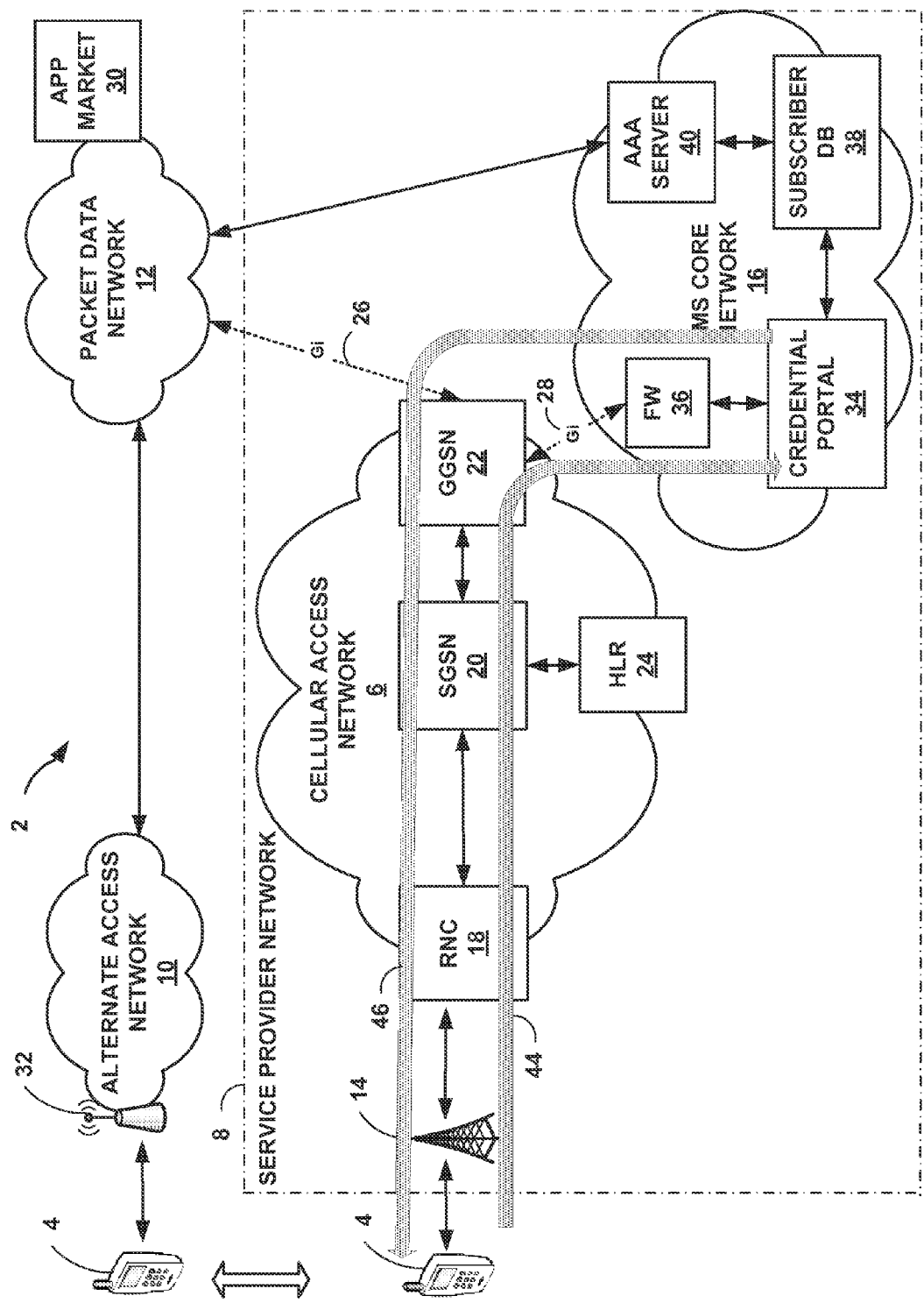

FIG. 1B illustrates WiFi Offload Manager of cellular mobile device 4 communicating with credential portal 34 in the background to provide credential portal 34 with certain identifying information for cellular mobile device 4. For example, when cellular mobile device 4 is connected to cellular network 6, the WiFi Offload Manager on cellular mobile device 4 may establish a communication session with credential portal 24 (e.g., an HTTPS session) and communicate via eXtensible Markup Language (XML)-based messages or Simple Object Access Protocol (SOAP) messages 44. At this time, WiFi Offload Manager reports an identifier (e.g., IMSI or IMEI) stored with the SIM card of cellular mobile device 4 or on the cellular device itself, and a WLAN Media Access Control (MAC) address of the cellular mobile device. Using the existing data services of cellular network 6, cellular mobile device 4 sends the message 44 to credential portal 34, which receives the message via firewall 36 coupled to GGSN 22.

By virtue of the message from cellular mobile device 4 coming through firewall 36, credential portal 34 can ascertain that cellular mobile device 4 has already been authenticated by SGSN 20. Furthermore, at this time, credential portal 34 may also learn the layer three (L3) network address (e.g., IP address) currently allocated to cellular mobile device 4 for use in receiving data services from cellular network 6. For example, credential portal 34 may examine the source IP address of messages 44 received from the WiFi Offload Manager executing on cellular mobile device 4. At this time, credential portal 34 generates a username and password based on the identifying information received from cellular mobile device 4, and sends a message 46 that includes the username and password back to cellular mobile device 4 for use in authentication on alternate access network 10. Moreover, credential portal 34 updates a subscriber record within subscriber database 38 to store the identifier of cellular mobile device 4 (e.g., the IMSI or IMEI), the layer two (L2) MAC address of the WLAN interface of the cellular mobile device, the generated username and password, and the layer three (L3) network address currently assigned to the cellular mobile device. Subscriber database 38 may be, for example, a Structured Query Language (SQL) database. As shown, subscriber database 38 may be accessed by (or integrated within) Authentication, Authorization, and Accounting (AAA) server 40 (e.g., a RADIUS server), for use in authenticating cellular mobile device 4. In some embodiments, subscriber database 38 may be integrated with HLR 24. In some aspects, credential portal 34 may also obtain WLAN policy information for the Wi-Fi Offload Manager from subscriber database 38, and may include the WLAN policy information in the message with the username and password.

As shown in FIG. 1B, cellular mobile device 4 may subsequently request access to alternate access network 10 using its WLAN interface in communication with WLAN access point 32. At this time, alternate access network 32 may request a username and password, which mobile cellular device 4 automatically supplies based on the credential information received from credential portal 34. AAA server 40 receives the credential information from alternate access network 10 along with the layer two (L2) MAC address for the WLAN interface of mobile cellular device 4. AAA server 40 accesses subscriber database, such as by using the identifier of the WLAN interface and/or the username as a key, and verifies that the credential information automatically provided by mobile cellular device 4 over alternate access network 10 match the credentials previously generated by credential portal 34 for the device having that particular WLAN interface or assigned that username.

Figure 1C:
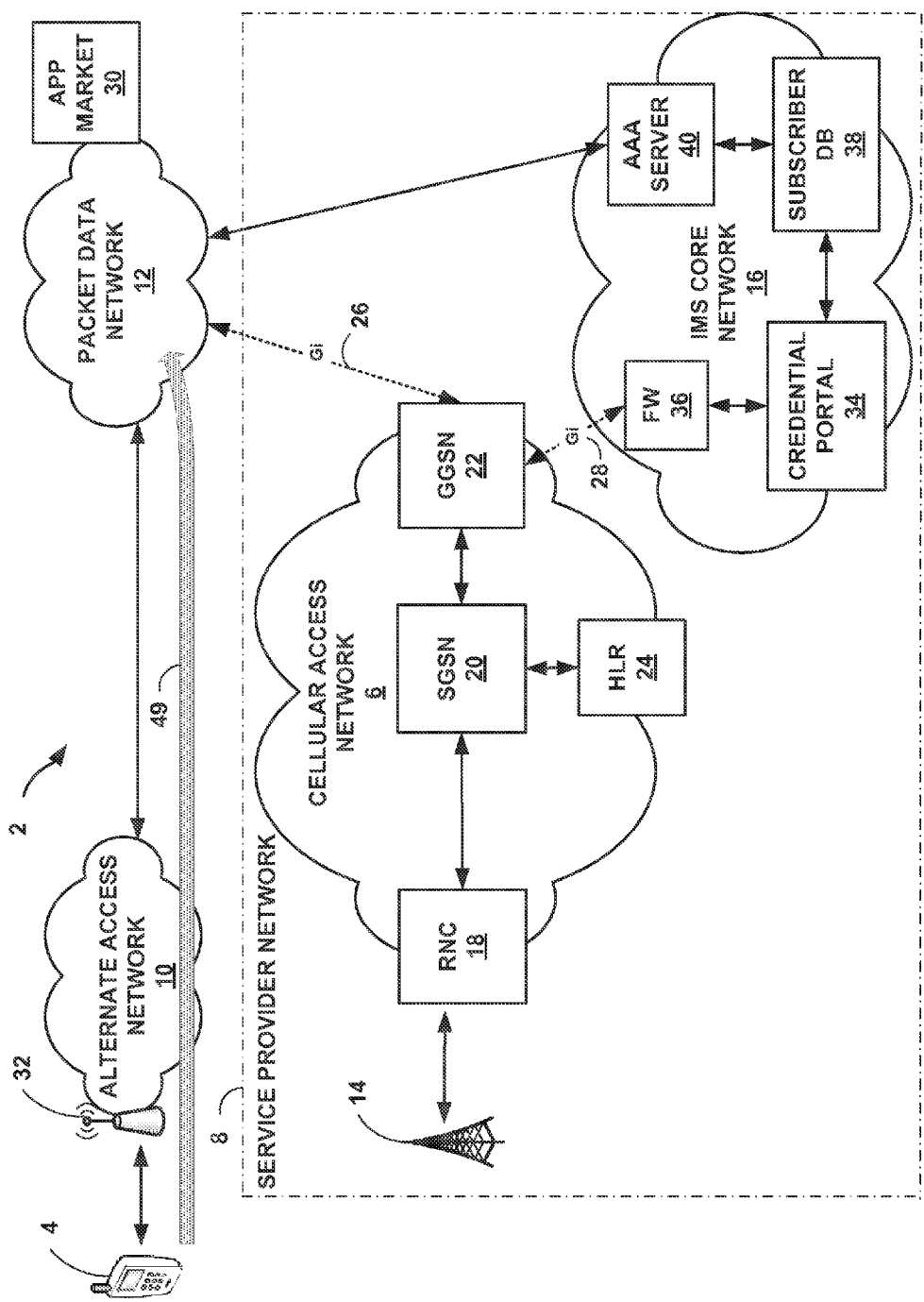

As shown in FIG. 1C, once authenticated, cellular mobile device 4 continues to communicate with PDN 12 and exchanges data communications 49 with PDN 12 through alternate access network 10 instead of cellular network 6. Although described for purposes of example with respect to a WLAN access point, the techniques of the disclosure may be applied to offload data communications to other types of wireless capabilities, such as Bluetooth, Near Field Communication (NFC), for example. The techniques of this disclosure may be applied to both WiFi Protected Access (WPA) Enterprises and Wireless Internet Service Provider roaming (WISPr) V1.0 Gateways. In some aspects, WLAN access point 34 may send usage information for cellular mobile device 4 to AAA server 40, which AAA server 40 can use for subscriber billing purposes. The geographic location of WLAN access point 32 relative to SP network 8 need not be limited, as long as WLAN access point 32 connected in some way to AAA server 40 of IMS core network 16.

Figure 2:
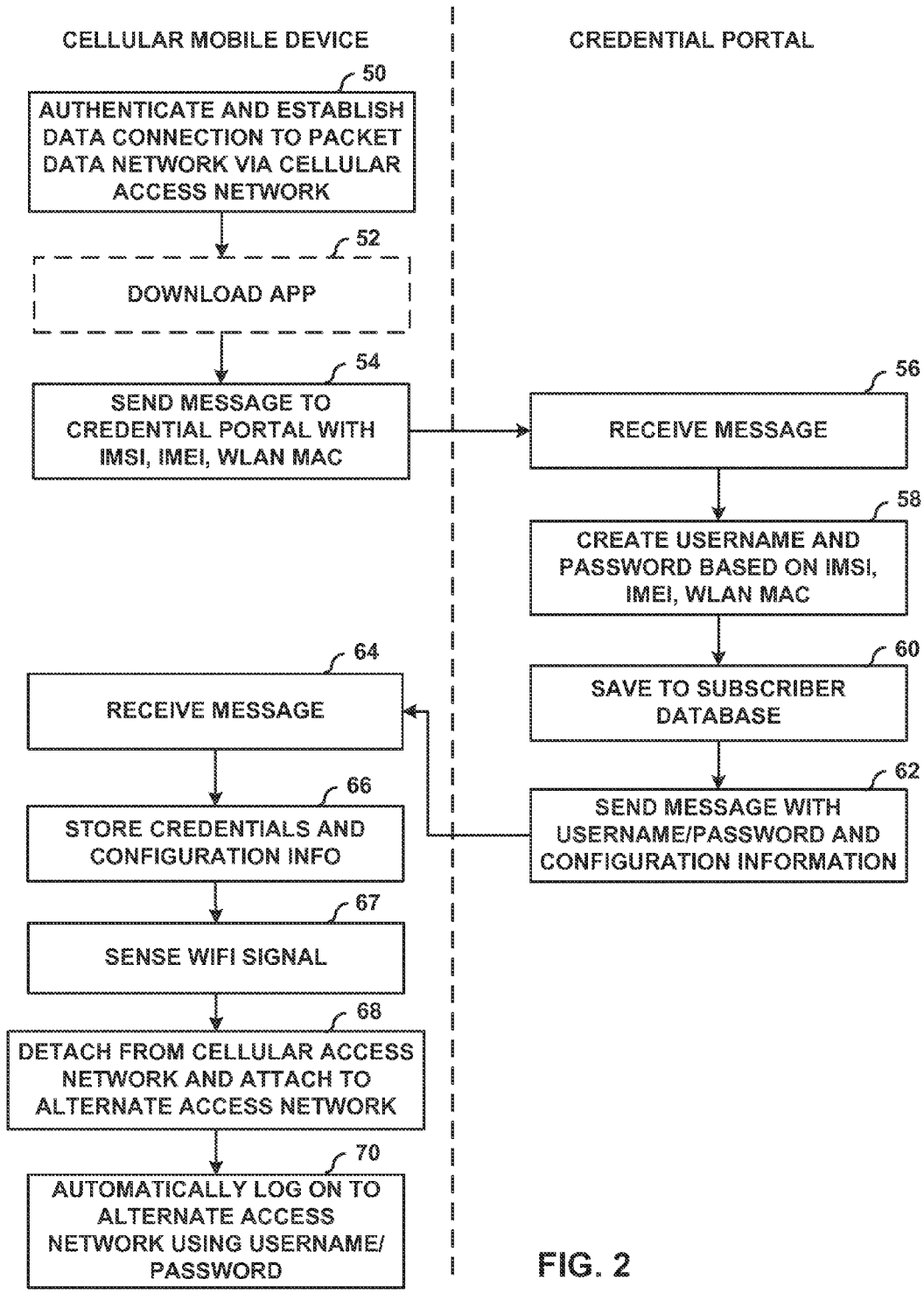
FIG. 2 is a flowchart illustrating example operation of a cellular mobile device and credential portal in accordance with aspects of this disclosure.

FIG. 2 is a flowchart illustrating example operation of cellular mobile device 4 and credential portal 34 in accordance with aspects of this disclosure. Cellular mobile device 4 is authenticated by SGSN 22 and HLR 24, e.g., using SIM credentials of cellular mobile device 4. After authentication, cellular mobile device 4 can exchange data communications with PDN 12 and IMS core network 16 via cellular network 6 (50). Cellular mobile device 4 optionally downloads a WiFi offload manager app from app market 30 (e.g., an electronic store or other repository) via PDN 12. The WiFi offload manager app may be received as a software package provided by a manufacturer of cellular mobile device 4. Alternatively, the WiFi offload manager app may come pre-loaded on the cellular mobile device (52).

Upon connecting to cellular network 6, the WiFi offload manager application executing on cellular mobile device 4 obtains cellular mobile device identifier(s), e.g., IMSI and/or IMEI, from the Subscriber Identity Module (SIM) card of cellular mobile device 4 or from the device itself. The WiFi offload manager also obtains the WLAN MAC from cellular mobile device 4.

The WiFi offload manager generates a communication that includes the IMSI and IMEI of cellular mobile device 4, and the WLAN MAC address of cellular mobile device 4, and sends the communication to the credential portal 34 (54). For example, the communication may take the form of a SOAP message, XML, or other message type, and may be sent via a Hypertext Transfer Protocol Secure (HTTPS) tunnel to credential portal 34. In one example aspect, cellular mobile device 4 may obtain the IP address of credential portal 34 via a DNS request to a DNS server (not shown in FIGS. 1A-1C). As another example, the IP) address of credential portal 34 may be programmed into the WiFi offload manager application executing on cellular mobile device 4.

In response to receiving the message from the WiFi offload manager (56), credential portal 34 generates a username and password based on the IMSI/IMEI and WLAN MAC address provided by cellular mobile device 4 (58). Credential portal 34 may, for example, generate a username that uses a Network Access Identifier (NAI) (e.g., joe_doe@att.com) to identify the user in third party roaming based on realms. Credential portal 34 stores the username and password to subscriber database 38 (60). That is, credential portal 34 updates a subscriber record within subscriber database 38 to associate the identifier (IMSI/IMEI) of cellular mobile device 4 and the generated credentials with the identifier (e.g., L2 MAC address) for the WLAN interface of the cellular mobile device. In addition, credential portal 34 may update the subscriber record to store a layer three (L3) network address (e.g., IP address) currently assigned to cellular mobile device 4 by the cellular network for providing data service to the cellular mobile device 4.

Subscriber database 38 may optionally provide WLAN offload policy information for the WiFi offload manager in the message. The policies may inform cellular mobile device 4 when to offload to the alternate access network 10 and which credentials to use then. In addition, the WLAN access point can obtain policies due to network management or for a particular session (cellular mobile device that is using the network), but these may be provided through AAA server 40. Credential portal 34 creates a message to send to the cellular mobile device 4 via the HTTPS tunnel that includes the username and password. In some embodiments, the message may also include the WLAN policy and possibly other configuration information. Credential portal 34 sends the message to cellular mobile device (62), e.g., via a SOAP message or XML.

Cellular mobile device 4 receives the message from credential portal 34 (64). In response to receiving the communication, cellular mobile device 4 programs the WiFi offload manager to use the credentials and policies when a WLAN access network is to be accessed (68). For example, the WiFi offload manager on cellular mobile device 4 may upon receipt apply the received credentials (username and password) to the Protected Extensible Authentication Protocol (PEAP) or Tunneled Transport Layer Security (TTLS) supplicant or WISPr V1.0 Smartclient on cellular mobile device 4 to be automatically supplied when later authenticating cellular mobile device 4 on alternate access network 10 using WLAN access point 32. This authentication then occurs without requiring any user input. For example, authentication may be triggered when cellular mobile device 4 senses the WiFi signal from WLAN access point 32, which may happen immediately after the credentials or stored, or at a later time (67). For example, cellular mobile device 4 may detect a signal having strength above a predefined threshold. Cellular mobile device 4 may in some embodiments look specifically for a WiFi signal from a WLAN access point 32 owned by the service provider that operates SP network 8. Cellular mobile device 4 sends an authentication message such as an 802.1x PEAP or TTLS authentication message to WLAN access point 32 that includes the username and password. WLAN access point 32 forwards the 802.1x PEAP/TTLS message to AAA server 40 with the WLAN MAC address of the cellular device 4 that is attached and requesting authentication.

AAA server 40 checks the username and password and the WLAN MAC address received in the PEAP/TTLS message against subscriber database 38. If the credentials match those stored by credential portal 34 in subscriber database 38 for the particular WLAN MAC address, AAA server 40 proceeds with authentication of cellular mobile device 4 on alternate access network 10 (70). At this point, cellular mobile device 4 is able to continue to exchange data communications with PDN 12 via alternate access network 10. In this manner, the authentication of cellular mobile device 4 on alternate access network 10 by AAA server 40 can proceed as usual according to 802.1x, without requiring access by AAA server 40 to the SIM credentials of cellular mobile device 4.

The techniques need not necessarily require user input to authenticate the cellular mobile device 4 on the alternate access network 10. For example, the user need not necessarily input a username and password to switch to the WLAN access point. Instead, the WiFi offload manager executing on the cellular mobile device can automatically obtain the authentication credentials and provide them to AAA server 40. Moreover, authenticating the cellular mobile device 4 on the alternate access network occurs may automatically without disruption to services provided from the packet data network to the cellular mobile device 4.

The exchange between cellular mobile device 4 and credential portal 34 may occur as soon as cellular mobile device 4 can reach credential portal 34, such as the first time cellular mobile device 4 is started with a connection manager. The devices may be configured to repeat this exchange as often as desired to refresh the password, and also may be done just before cellular mobile device 4 moves to the WLAN network. Alternatively, a single username/password may be used for the lifetime of cellular mobile device 4. The cellular mobile device 4 may therefore still be able to use the provided login credentials when cellular mobile device 4 senses an alternate access network 10 but cannot reach cellular network 6 anymore to obtain credentials.

Figure 3:
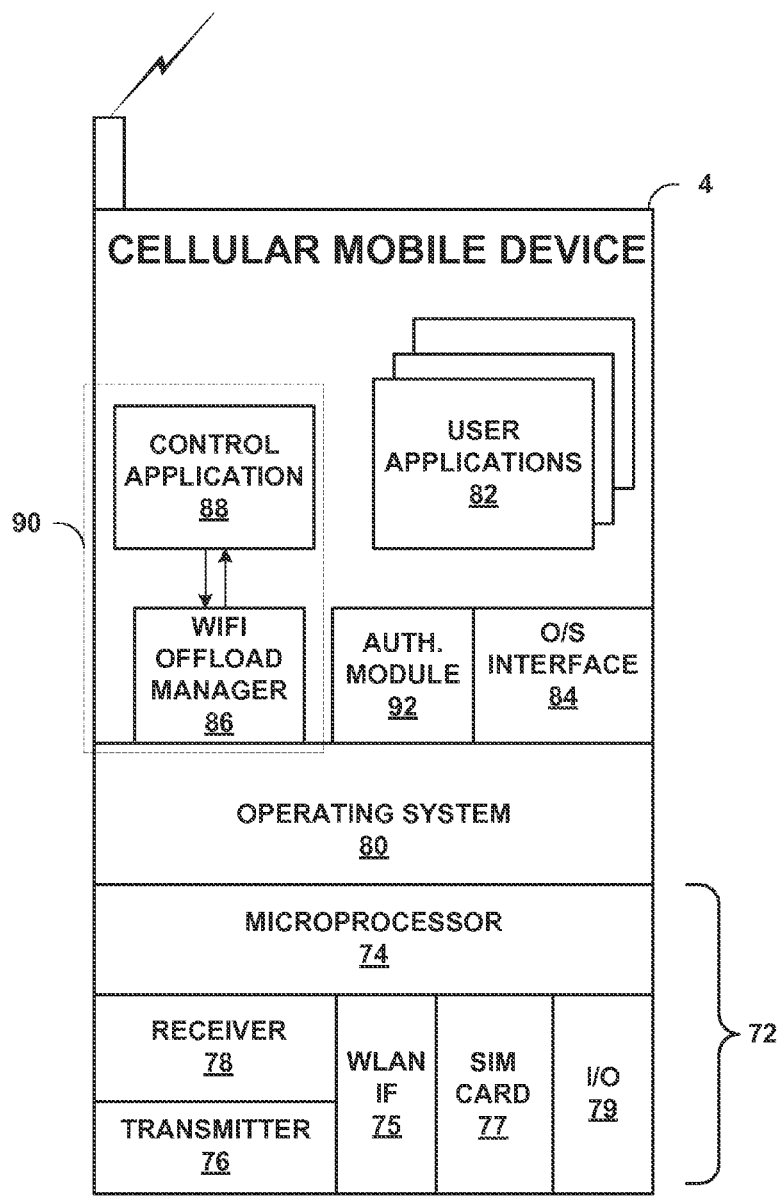
FIG. 3 is a block diagram illustrating an example embodiment of a cellular mobile device that operates in accordance with the techniques described herein.

FIG. 3 is a block diagram illustrating an example embodiment of a cellular mobile device 4 that operates in accordance with the techniques described herein. In this example, cellular mobile device 4 includes a hard-ware 72 that provides core functionality for operation of cellular mobile device 4. Hardware 72 may include one or more programmable microprocessors 74 configured to operate according to executable instructions (i.e., program code), typically stored in a computer-readable medium such as static, random-access memory (SRAM) device or Flash memory device. Transmitter 76 and receiver 78 communicate with other communication devices via a wireless communication, such as cellular communications in the form of high-frequency radio frequency (RF) signals. Hardware 72 may include additional discrete digital logic or analog circuitry. WLAN interface (IF) 75 is an interface, such as a wireless access card, used for connecting to a wireless network, and has an associated a L2 address, such as a MAC address, referred to as a WLAN MAC address of cellular mobile device 4. WLAN IF may send and receive wireless communications according to 802.3, and use the IEEE 802.1x standard for authentication. SIM card 77 stores information that uniquely identifies cellular mobile device 4, including an IMSI. Input/output component (I/O) 79 allows data signals to be input and output from cellular mobile device 4. As one example, a user of cellular mobile device 4 may interact with cellular mobile device 4 via I/O 79.

Operating system 80 executes on microprocessor 74 and provides an operating environment for one or more user applications 82 (commonly referred to "apps"). O/S interface 84 proves an interface layer of software capable of making kernel calls into operating system 80. In other words, O/S interface 84 provides a framework within which WiFi offload manager 86 operates and may, for example, allow WiFi offload manager 86 to execute within a "user" space of the operating environment provided by cellular mobile device 4. O/S interface 84 may allow other forms of protocol handlers to be "plugged in" for interfacing with operating system 80. O/S interface 84 interacts with operating system 80 to provide OS-level support for protocol-specific handlers.

In some cases, executable code for control application 88 and WiFi offload manager 84 may be distributed as a single distribution package 90 that is downloadable from a standard "app" deployment mechanism, such as provided by a server associated with an electronic store or other repository for user applications, and/or provided by a manufacturer of cellular mobile device 4. That is, control application 80 and WiFi offload manager 84 may be integrated into a multi-service client for cellular mobile device 4 to allow easy deployment. An application management utility on cellular mobile device 4 may, for example, issue a request to an App market 30 server and, in response receive distribution package for processing and installation on cellular mobile device 4. Control application 80 may provide a user interface by which a user of cellular mobile device 4 is able to configure and manage WiFi offload manager 84.

After cellular mobile device 4 is authenticated on cellular network 6 by interacting with SGSN 20 and HLR 24 and using its SIM credentials, cellular mobile device 4 exchange data communications with PDN 12 via cellular network 6. When WiFi offload manager 84 of cellular mobile device 4 is attached to the cellular network 6, WiFi offload manager 84 obtains the IMSI from the SIM card 77 of cellular mobile device 4, and/or the IMEI from cellular mobile device 4 and generates a message that includes the IMSI and IMEI. WiFi offload manager 84 also obtains the WLAN MAC address of WLAN interface 75 of cellular mobile device 4 and includes this in the message. WiFi offload manager 84 sends the message via an HTTPS tunnel to credentials portal 34 of IMS core network 16 over cellular network 6. The message may be, for example, a SOAP message or XML. As another example, WiFi offload manager 84 may cause cellular mobile device 4 to transmit the credentials information to credential portal 34 by a Short Message Service (SMS) message.

WiFi offload manager 84 also processes a response message received from credential portal 34, e.g., via a SOAP message, XML, SMS, or the like. The response message includes a username and password generated by credential portal 34, and may also include WLAN policy information for WLAN access point 32. WiFi offload manager 84 stores the username, password, and WLAN policy information to memory of cellular mobile device 4. Authentication module 92 uses the stored username and password for authentication with AAA server 40 (e.g., 802.1x authentication) to log on to alternate access network 10. Authentication module 92 may also use the WLAN policies to use (e.g., SSID to use for WiFi).

Figure 4:
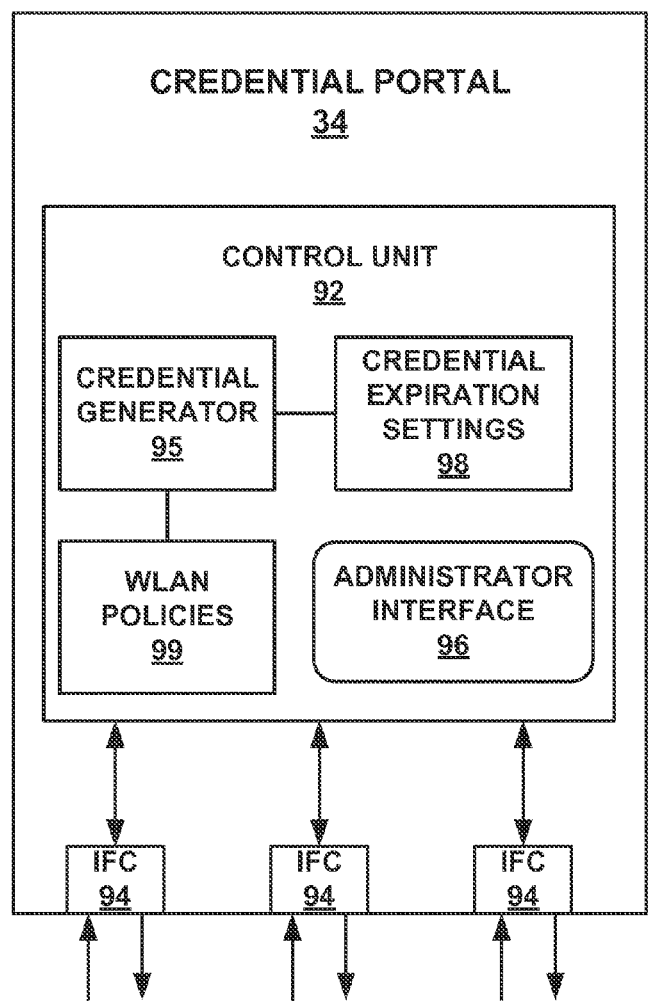
FIG. 4 is a block diagram illustrating an example embodiment of a credential portal in accordance with the techniques of this disclosure.

FIG. 4 is a block diagram illustrating an example embodiment of a credential portal 34 in accordance with the techniques of this disclosure. In the example of FIG. 4, credential portal 34 includes a control unit 92 and a set of interface cards (IFCs) 94 for communicating packets via inbound links and outbound links. As one example, credential portal 34 may be a provisioning server.

Control unit 92 includes credential generator 95. Credential generator 95 generates a username and password for a cellular mobile device 4 based on the IMSI/IMEI, and WLAN MAC address received from cellular mobile device 4. The username and password may be persistent credentials, or may be one-time use credentials for cellular mobile device 4, requiring that cellular mobile device 4 obtain new credentials each time cellular mobile device 4 logs on to alternate access network 10, or upon expiration of a time period. Credential generator 95 forms a message to send to cellular mobile device 4 that includes the generated username and password.

Control unit 92 includes an administrator interface 96, by which a network administrator can configure credential portal 34. For example, the administrator may configure credential expiration settings 98, which may include a time period after which a given username/password will expire for a cellular mobile device. The time period may be a fixed period of time after which the credentials will expire. Credential portal 34 may also provide information about credential expiration settings 98 to cellular mobile device 4 when providing credentials.

Control unit 92 also includes WLAN policies 99, which credential generator 95 may access to obtain WLAN policies specific to the WLAN MAC address provided by cellular mobile device 4. WLAN policies provide configuration information for cellular mobile device 4 for WiFi usage on the alternate access network 10. WLAN policies 99 may include, for example, a broadcast SSID to use on the WiFi network, priority level to be used for the offloading, credential renewal policies, and other policies.

In some embodiments, additional aspects may also be included to increase security. For example, the username/passwords provided by credential portal 34 may expire after a configurable time period, e.g., daily, hourly, or other time period. When the username/password combination expires on cellular mobile device 4, WiFi offload manager 84 may send a new message with the IMSI, IMEI, and WLAN MAC to credential portal 34, and credential portal 34 returns a new username/password. The expiration time period may be configured on credentials manager 34 and WiFi offload manager 84, e.g., depending on service provider preferences. As another example of enhanced security features, WiFi offload manager 84 may require a new password to be assigned by credentials manager 34 before cellular mobile device 4 returns to alternate access network 10, should cellular mobile device 4 return to the cellular network 6 in the interim. As another example, credentials portal 34 may transfer authentication credentials by an out-of-band transport mechanism, such as SMS, for example.

Figure 5:
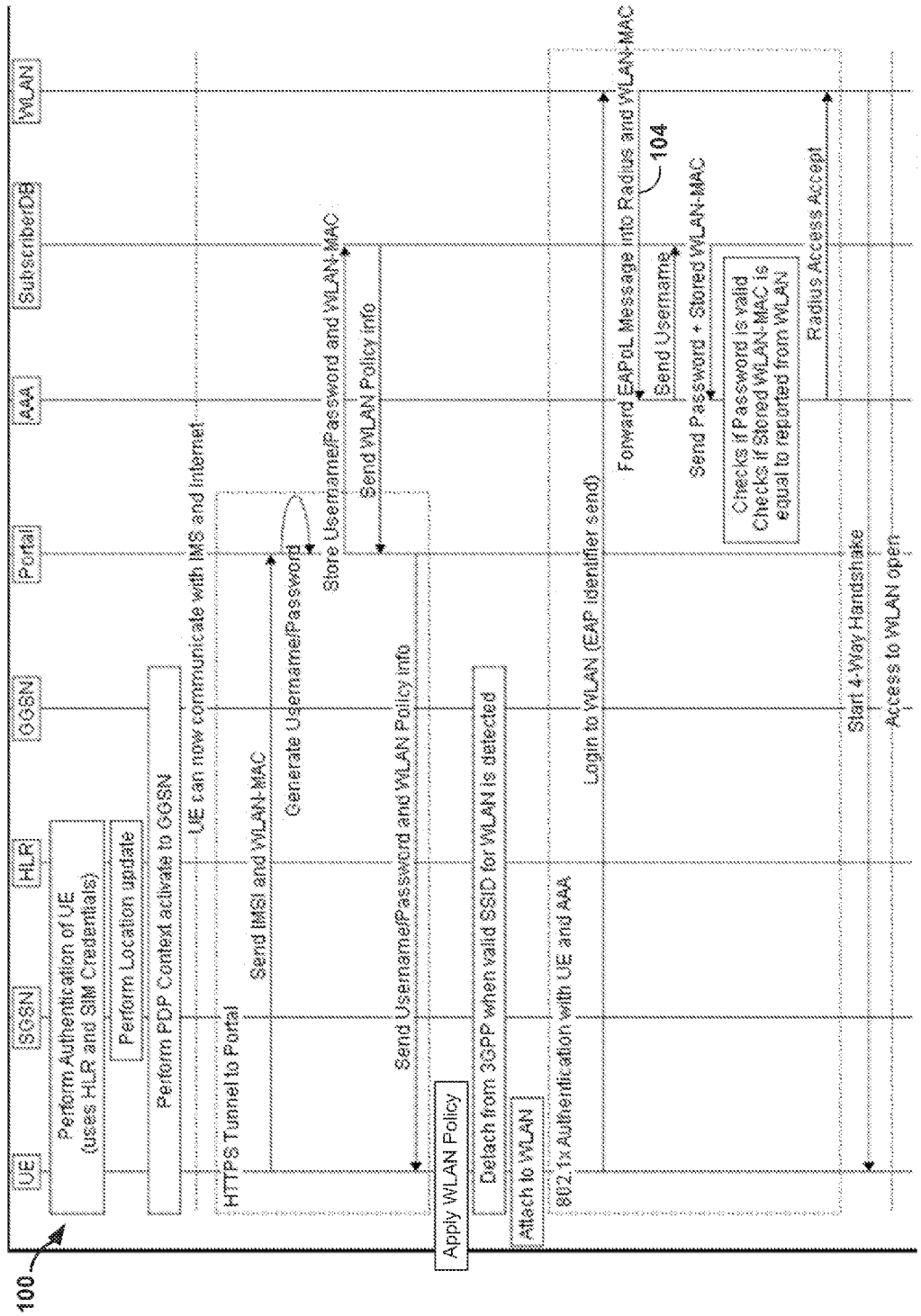
FIGS. 5-6 are sequence diagrams illustrating example operation of network devices in accordance with the techniques of this disclosure.

FIG. 5 is a sequence diagram 100 illustrating example operation of network devices in accordance with the techniques of this disclosure. The example of FIG. 5 illustrates operation of User Equipment (UE) (e.g., cellular mobile device 4), SGSN 20, HLR 24, GGSN 22, a portal (e.g., credential portal 34), AAA 40, and WLAN access point 32, in operating in accordance with one example aspect of this disclosure. Specifically, FIG. 5 illustrates example operation in a WPA network. As shown in FIG. 5, the UE, SSGN, and HLR perform authentication of the UE over cellular network 6. After the PDP Context activate to the GGSN, the UE can communicate with IMS core network 16 and PDN 12 (e.g., the Internet).

AAA server 40 checks the username and password and the WLAN MAC address received in the PEAP/TTLS message against subscriber database 38. If the credentials match those stored by credential portal 34 in subscriber database 38, AAA server 40 proceeds with authentication of cellular mobile device 4 on alternate access network 10, and then cellular mobile device 4 can exchange data communications with PDN 12 via alternate access network 10. In this manner, the authentication of cellular mobile device 4 on alternate access network 10 by AAA server 40 can proceed as usual according to 802.1x, without requiring access by AAA server 40 to the SIM credentials of cellular mobile device 4.

In addition, during authentication with the AAA server 40, WLAN access point 32 may report the WLAN MAC address that was given to cellular mobile device 4 (e.g., within an EAPoL message 104). AAA server 40 queries subscriber database 38 with the username, and subscriber database 38 returns the stored password and WLAN MAC address associated with the username. After AAA server 40 checks whether the password and WLAN MAC are valid and matching, AAA server 40 sends a RADIUS Access Accept to WLAN access point 32. Checking the WLAN MAC address can be optional, and used as an additional security check to avoid a user of cellular mobile device 4 sharing a received username and password from credential portal 34 with other cellular mobile devices that have not been authenticated through SGSN 20 of cellular network 6, and that then try to log in on alternate access network 10 using the username and password but through a different WLAN MAC address.

Figure 6:
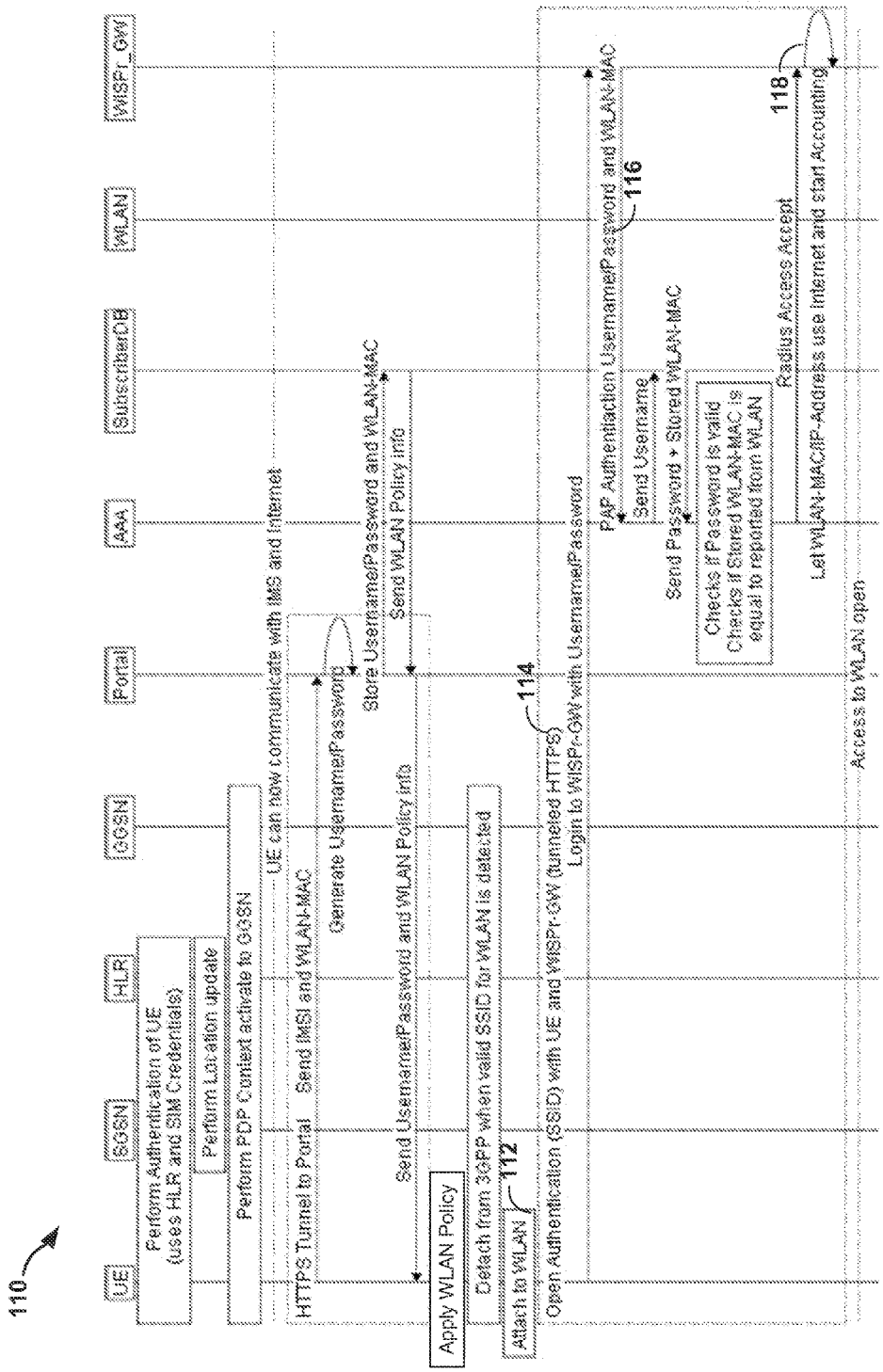

FIG. 6 is a sequence diagram 110 illustrating example operation of network devices in accordance with the techniques of this disclosure. The example of FIG. 6 illustrates operation of User Equipment (UE) (e.g., cellular mobile device 4), SGSN 20, HLR 24, GGSN 22, a portal (e.g., credential portal 34), AAA 40, WLAN access point 32, and a WISPr V1.0 Gateway in operating in accordance with another example aspect of this disclosure. Specifically, FIG. 6 illustrates example operation in a WISPr V1.0 network. The techniques may be similar to those described above with respect to WPA networks, with a few differences. For example, after the UE attaches to the WLAN (e.g., alternate access network 10) (112) using SSID, the UE opens authentication with the WISPr Gateway using SSID via tunneled HTTPS (114). Within the tunneled HTTPS session, the UE logs in to the WISPr Gateway using the username/password credentials provided by credential portal 34. The WISPr Gateway sends a PAP authentication (116) to AAA server 40 that includes the username/password and WLAN MAC address. AAA server 40 queries subscriber database 38 with the username, and subscriber database 38 returns the stored password and WLAN MAC address associated with the username. After AAA server 40 checks whether the password and WLAN MAC are valid and matching, AAA server 40 sends a RADIUS Access Accept to WISPr Gateway, and WISPr Gateway lets the WLAN MAC/IP address combination use the Internet and starts accounting (118).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
in response to determining that a cellular mobile device is authenticated on a service provider cellular network, automatically sending by the cellular mobile device a communication to a credential portal positioned within a core network of the service provider, wherein the communication includes an identifier of the cellular mobile device obtained from hardware of the cellular mobile device and a layer two (L2) address associated with the cellular mobile device;
receiving, by the cellular mobile device, a communication from the credential portal, wherein the communication includes a username and password generated by the credential portal for use in authenticating the cellular mobile device on an alternate access network separate from the service provider cellular network, wherein the username and password are newly generated by the credential portal based on the identifier of the cellular mobile device and the L2 address associated with the cellular mobile device;
storing the username and password by the cellular mobile device;
disconnecting the cellular mobile device from the service provider cellular network;
automatically providing, by the cellular mobile device, the username and password to a wireless access point of the alternate access network for authenticating the cellular mobile device on the alternate access network; and
after the cellular mobile device is authenticated on the alternate access network, sending, by the cellular mobile device, data communications to a packet data network by the alternate access network instead of by the cellular network.

2. The method of claim 1, wherein automatically providing, by the cellular mobile device, the username and password to the wireless access point for authenticating comprises sending the username and password to the wireless access point via an authentication message automatically sent by an application on the cellular mobile device to an Authentication, Authorization, and Accounting (AAA) server.

3. The method of claim 1, wherein automatically providing, by the cellular mobile device, the username and password to the wireless access point for authenticating comprises automatically providing the username and password to a Wireless Internet Service Provider roaming (WISPr) gateway device.

4. The method of claim 1, further comprising:
executing an offload manager application on an operating system of the cellular mobile device;
obtaining, by the offload manager application, the identifier of the cellular mobile device from a subscriber identity module (SIM) card of the cellular mobile device;
obtaining, by the offload manager application, the L2 address of the cellular mobile device, wherein the address of the cellular mobile device comprises a WLAN MAC address of a wireless access card of the cellular mobile device; and automatically generating, by the offload manager application, the communication sent by the cellular mobile device upon connecting to the cellular network.

5. The method of claim 1, further comprising downloading the offload manager application to the cellular mobile device from an applications store via the packet data network.

6. The method of claim 1, wherein the identifier of the cellular mobile device includes at least one of an International Mobile Subscriber Identity (IMSI) and an International Mobile Equipment Identity (IMEI), and wherein the L2 address associated with the cellular mobile device comprises a Wireless Local Area Network (WLAN) Media Access Control (MAC) address of a wireless card of the cellular mobile device.

7. The method of claim 6, wherein receiving a communication comprises receiving a communication that includes a username and password generated by the credentials provider based on the IMSI of a subscriber identity module (SIM) card of the cellular mobile device, the IMEI of the cellular mobile device, and the WLAN MAC address of the cellular mobile device.

8. The method of claim 1, wherein automatically providing the username and password to the wireless access point comprises automatically providing the username and password to the wireless access point upon the cellular mobile device detecting a signal of the wireless access point.

9. The method of claim 1, wherein the communication received having the username and password also includes wireless policy information for use by the cellular mobile device in connecting to the alternate access network.

10. The method of claim 9, further comprising:
upon receiving the communication from the credential provider, storing, by the cellular mobile device, the wireless policy information received in the communication; and
operating, by the cellular mobile device, according to the wireless policy information when connecting to the alternate access network.

11. The method of claim 1,
wherein sending the communication by the cellular mobile device comprises sending the communication to the credential portal as a via a Hypertext Transfer Protocol Secure (HTTPS) tunnel between the cellular mobile device and the credential portal, and
wherein receiving the communication from the credential portal comprises receiving the communication comprises receiving the communication through the HTTPS tunnel.

12. The method of claim 11, wherein sending the communication comprises sending a first Simple Object Access Protocol (SOAP) message through the HTTPS tunnel, and wherein receiving the communication comprises receiving a second SOAP message through the HTTPS tunnel.

13. The method of claim 11, wherein sending the communication comprises sending a first eXtensible Markup Language (XML) message through the HTTPS tunnel, and wherein receiving the communication comprises receiving a second XML message through the HTTPS tunnel.

14. The method of claim 1,
wherein sending the communication by the cellular mobile device comprises sending the communication to the credential portal as a short message service (SMS) message, and wherein receiving the communication from the credential portal comprises receiving the communication from the credential portal as an SMS message.

15. The method of claim 1, wherein the communication received having the username and password also includes configuration information indicating an expiration time for the username and password, after which the cellular mobile device must obtain a new username and password from the credential portal for authentication on the alternate access network.

16. The method of claim 1, wherein authenticating the cellular mobile device on the alternate access network occurs without disruption to services provided from the packet data network to the cellular mobile device.

17. The method of claim 1, wherein the credential portal comprises a provisioning server.

18. A cellular mobile device comprising:
a transmitter and receiver to send and receive cellular communications in the form of radio frequency signals;
a wireless access card to send and receive wireless communications over a Wireless Local Area Network (WLAN) interface;
a microprocessor;
an operating system executing on the microprocessor to provide an operating environment of application software; and
an offload manager application executing on the operating system, wherein, in response to determining that the cellular mobile device is authenticated on a service provider cellular network, the offload manager application is configured to automatically send a communication to a credential portal positioned within a core network of the service provider, wherein the communication includes an identifier of the cellular mobile device obtained from hardware of the cellular mobile device and a layer two (L2) address of the wireless access card,
wherein the offload manager receives a communication from the credential portal, wherein the communication includes a username and password newly generated by the credential portal for use in authenticating the cellular mobile device on an alternate access network separate from the service provider cellular network, wherein the username and password are generated by the credential portal based on the identifier of the cellular mobile device and the L2 address associated with the cellular mobile device,
wherein the offload manager stores the username and password, and
wherein the offload manager disconnects the cellular mobile device from the service provider cellular network in response to receiving the communication from the credential portal and sensing a signal from a wireless access point of the alternate access network, and automatically authenticates the cellular mobile device on the alternate access network by providing the username and password to the wireless access point.

19. The cellular mobile device of claim 18, wherein the offload manager application obtains the identifier of the cellular mobile device from a subscriber identity module (SIM) card of the cellular mobile device, and obtains the L2 address of the cellular mobile device from the wireless access card, wherein the address of the wireless access card comprises a Wireless Local Area Network (WLAN) Media Access Control (MAC) address.

20. The cellular mobile device of claim 18, wherein the offload manager application is received as a software package from an electronic repository.

21. The cellular mobile device of claim 18, wherein the identifier of the cellular mobile device includes at least one of an International Mobile Subscriber Identity (IMSI) and an International Mobile Equipment Identity (IMEI), and wherein the L2 address associated with the cellular mobile device comprises a Wireless Local Area Network (WLAN) Media Access Control (MAC) address of a wireless card of the cellular mobile device.

22. The cellular mobile device of claim 18, wherein the communication received having the username and password also includes wireless policy information for use by the cellular mobile device in connecting to the alternate access network, and wherein the offload manager application stores the wireless policy information received in the communication, and operates according to the wireless policy information when connecting to the alternate access network.

23. The cellular mobile device of claim 18, wherein the offload manager application sends the communication to the credential portal via a Hypertext Transfer Protocol Secure (HTTPS) tunnel between the cellular mobile device and the credential portal, and receives the communication from the credential portal through the HTTPS tunnel.

24. The cellular mobile device of claim 18, wherein the offload manager application sends the communication to the credential portal as a short message service (SMS) message, and receives the communication from the credential portal as an SMS message.

25. A non-transitory computer-readable storage medium comprising instructions for causing a programmable processor of a cellular mobile device to:
  in response to determining that the cellular mobile device is authenticated on a service provider cellular network, automatically send a communication to a credential portal positioned within a core network of the service provider, wherein the communication includes an identifier of the cellular mobile device obtained from hardware of the cellular mobile device and a layer two (L2) address associated with the cellular mobile device;
  receive a communication from the credential portal, wherein the communication includes a username and password newly generated by the credential portal for use in authenticating the cellular mobile device on an alternate access network separate from the service provider cellular network, wherein the username and password are generated by the credential portal based on the identifier of the cellular mobile device and the L2 address associated with the cellular mobile device;
  storing the username and password;
  disconnect the cellular mobile device from the service provider cellular network;
  automatically provide the username and password to a wireless access point of the alternate access network for authenticating the cellular mobile device on the alternate access network; and
  after the cellular mobile device is authenticated on the alternate access network, send data communications to a packet data network by the alternate access network instead of by the cellular network.

26. A system comprising:
  a packet data network;
  a service provider network comprising:
    a core network comprising:
      a credential portal;
      an Authentication, Authorization, and Accounting (AAA) server; and
      a subscriber database accessible by the credential portal and the AAA server; and
    a cellular network for accessing the core network and the packet data network;
  a cellular mobile device comprising a microprocessor, an operating system executing on the microprocessor to provide an operating environment of application software, a wireless access card to send and receive wireless communications over a Wireless Local Area Network (WLAN) interface, and an offload manager application executing on the operating system, wherein the cellular mobile device is authenticated on the cellular network,
  an alternate access network for accessing the packet data network; and
  a wireless access point coupled to the alternate access network,
  wherein after the cellular mobile device is authenticated on a service provider cellular network, the offload manager application is configured to automatically send a communication to the credential portal, wherein the communication includes an identifier of the cellular mobile device obtained from hardware of the cellular mobile device and a layer two (L2) address of the wireless access card,
  wherein, upon receiving the communication, the credential portal generates a username and password based on the identifier of the cellular mobile device and the L2 address associated with the cellular mobile device, and sends the username and password to the cellular mobile device for use in authenticating the cellular mobile device on the alternate access network,
  wherein, upon receiving the username and password from the credential portal, the offload manager stores the username and password, and later disconnects the cellular mobile device from the service provider cellular network, and automatically authenticates the cellular mobile device on the alternate access network by providing the username and password to the wireless access point.

27. A credential portal comprising:
  a physical interface that receives a communication from a cellular mobile device, wherein the communication includes an identifier of the cellular mobile device obtained from hardware of the cellular mobile device and a layer two (L2) address associated with the cellular mobile device, wherein the cellular mobile device is previously authenticated on a cellular network of a service provider; and
  a credential generator that newly generates a username and password based on the identifier of the cellular mobile device and the L2 address associated with the cellular mobile device,
  wherein the credential portal stores the received identifier of the cellular mobile device and the L2 address associated with the cellular mobile device and the generated username and password to a subscriber database accessible by an Authentication, Authorization, and Accounting (AAA) server that is used by a wireless access point of an alternate access network separate from the service provider cellular network, and
  wherein the credential portal forms a message that includes the username and password, and sends the message to the cellular mobile device for use in authenticating the cellular mobile device on the alternate access network.

28. The credential portal of claim 27, wherein the credential portal comprises a provisioning server of the service provider.

29. A method comprising:
- receiving, by a credential portal, a communication from a cellular mobile device, wherein the communication includes an identifier of the cellular mobile device obtained from hardware of the cellular mobile device and a layer two (L2) address associated with the cellular mobile device, wherein the cellular mobile device is previously authenticated on a cellular network of a service provider;
- newly generating, by the credential portal, a username and password based on the identifier of the cellular mobile device and the L2 address associated with the cellular mobile device;
- storing, by the credential portal, the received identifier of the cellular mobile device and the L2 address associated with the cellular mobile device and the generated username and password to a subscriber database accessible by an Authentication, Authorization, and Accounting (AAA) server that is used by a wireless access point of an alternate access network separate from the service provider cellular network;
- forming a message that includes the username and password; and sending the message to the cellular mobile device for use in authenticating the cellular mobile device on the alternate access network.

30. The method of claim 29, wherein forming the message comprises forming a message that also includes wireless access policies for the cellular mobile device.

\* \* \* \* \*